United States Patent [19]
Goodhart

[11] 4,072,208
[45] Feb. 7, 1978

[54] METHOD AND APPARATUS FOR SEISMIC PROSPECTING

[75] Inventor: Rupert Richard Francis Gerard Heron Goodhart, Birmingham, England

[73] Assignee: Imperial Chemical Industries Limited, London, England

[21] Appl. No.: 543,221

[22] Filed: Jan. 22, 1975

Related U.S. Application Data

[63] Continuation of Ser. No. 208,765, Dec. 16, 1971, abandoned.

[30] Foreign Application Priority Data

Dec. 29, 1970   United Kingdom ............... 61602/70

[51] Int. Cl.² .................... G01V 1/02; G01V 1/10; 102 23
[52] U.S. Cl. ..................................... 181/401; 181/116
[58] Field of Search ............................ 340/15.5 R, 17; 181/114, 116, 401; 86/20 C

[56] References Cited

U.S. PATENT DOCUMENTS

| | | | |
|---|---|---|---|
| 2,377,903 | 6/1945 | Rieber | 181/116 |
| 2,990,904 | 7/1961 | Hawkins et al. | 340/15.5 R |
| 3,632,172 | 1/1972 | Robinson et al. | 102/23 |
| 3,712,220 | 1/1973 | Marke et al. | 102/23 |
| 3,729,060 | 4/1973 | Murray | 181/116 |

FOREIGN PATENT DOCUMENTS

| | | | |
|---|---|---|---|
| 1,151,882 | 5/1969 | United Kingdom | 181/114 |
| 1,184,698 | 3/1970 | United Kingdom | 102/22 |

*Primary Examiner*—Nelson Moskowitz
*Attorney, Agent, or Firm*—Cushman, Darby & Cushman

[57] ABSTRACT

A method of seismic prospecting areas having a hard snow covered surface which comprises clearing the snow from a surface strip, laying a line of detonating cord on the surface, covering the cord with a layer of snow, compressing the snow layer to form a stemming layer around the cord, detonating the explosive and recording the reflected or refracted seismic waves.

The invention also includes an apparatus comprising a combination of snow ploughs, snow compressor and cord feed means for use in the method.

15 Claims, 4 Drawing Figures

METHOD AND APPARATUS FOR SEISMIC PROSPECTING

This is a continuation, of application Ser. No. 208,765 filed Dec. 16, 1971, now abandoned.

This invention relates to a method of seismic prospecting and to an apparatus for use in the said method. More particularly, the invention relates to a method of seismic prospecting in hard or frozen areas covered with a layer of snow.

In seismic prospecting it is usual to generate seismic waves by exploding charges of high explosive at the prospect area and to record the waves after reflection or refraction from subterranean rock layer interfaces. The record shows the underground rock structures in the area. Methods of seismic prospecting have recently been developed wherein the seismic waves are generated by detonating a flexible elongated linear explosive charge, for example detonating cord, placed under stemming parallel to the surface of the prospect area. The placing of explosive charges for generating seismic waves in this manner is described in British patent specifications Nos. 1,151,882 and 1,151,883. The preferred method of placing the charge is to bury it in the upper ground layer by passing it in a continuous manner through a conduit attached to a tine which penetrates the ground as it is advanced and forms a temporary opening into which the charge is fed. This method has proved very successful in areas where the surface layer is sufficiently soft to be penetrated by a tine. However, where the surface layer is hard, for example where it consists of rock, frozen earth or ice, such as in arctic regions, the method is difficult and often impossible to apply. In such conditions, even where the surface can be penetrated, the surface layer cracks into large fragments which, when they settle over the explosive charge, leave voids. This results in marked reduction in the degree of confinement of the charge and generally poor seismic records.

Many of the areas in which seismic prospecting is contemplated have surfaces consisting of snow covered ice or frozen earth. It is an object of this invention to provide a method of seismic prospecting wherein an explosive cord charge placed parallel to the surface of a prospect area is used to generate seismic waves in areas having a hard snow covered surface layer. Another object is to provide an apparatus suitable for placing an explosive cord charge in position for seismic prospecting on a snow covered hard surface.

In accordance with this invention a method of seismic prospecting comprises clearing snow from a surface strip of a hard snow covered area, laying a line of explosive cord along the cleared strip, covering the line of explosive cord with a layer of snow, compressing the said snow layer to form a stemming layer around the cord, detonating the explosive and recording the resulting seismic waves after reflection or refraction from subterranean rock layer interfaces. Advantageously the line of explosive cord is laid by feeding it in a continuous manner through an advancing conduit as the conduit is moved along the hard surface. The explosive cord should preferably be held in position on the hard surface until the covering of snow can be applied and for this purpose the explosive cord may advantageously be biassed towards the surface by, for example, a spring-loaded plate or roller. Positioning of the explosive is facilitated if a groove is cut in the cleared surface strip and the explosive cord is fed into the groove.

In a preferred form of the invention further snow is heaped on top of the compressed snow layer to improve the stemming. A covering of uncompressed snow by itself contains too many voids and does not sufficiently confine the explosive charge. It is necessary for the snow immediately surrounding the explosive charge to be compressed to achieve sufficient contact with the explosive cord.

The invention also includes an apparatus for placing a line of explosive cord in position for use as a source of energy for seismic prospecting on a hard snow covered surface, the apparatus comprising in combination a first snow plough to clear snow from a surface strip as the apparatus is advanced, explosive feed means to feed a line of explosive cord in a continuous manner to lie on the surface of the cleared strip, a second snow plough to move snow, from a snow covered surface portion adjacent to the cleared strip, on top of the explosive cord and snow consolidating means to compress the snow on top of the explosive cord to provide stemming therefor.

The explosive feed means preferably comprises a conduit terminating between the first and second snow plough, through which conduit the explosive cord may be fed to the surface. The conduit is advantageously attached to a rigid vertical plate positioned so that in use its bottom edge contacts the hard surface. Preferably the plate is mounted so as to be free to move vertically to follow irregular surfaces. The bottom edge of the plate may advantageously be formed with a point or edge to score a groove in the hard surface into which groove the explosive cord may be fed.

The snow consolidating means conveniently comprises one or more downwardly biassed spring-loaded plates or rollers positioned behind the second snow plough to press down the snow layer. The consolidating means may also, if desired, be attached to the second snow plough.

In order to prevent the explosive cord from moving before being covered with snow by the second snow plough, the apparatus may comprise means to hold the explosive cord in its laid position until it is covered with snow by the second snow plough. The cord holding means may, for example, comprise a downwardly biassed element such as a spring-loaded plate or roller positioned to press the cord against the hard surface.

In a preferred apparatus a third snow plough is provided to heap snow on top of the compressed snow layer. This plough may advantageously have very large blades, for example blades capable of moving snow from 8 feet on each side of the laid explosive cord to a height of 4 feet above the cord. If desired, the plough action may be assisted by providing an Archimedian screw conveyor in association with one or both blades to convey the snow across the blade.

In order to illustrate the invention further a preferred apparatus is hereinafter described, by way of example only, with reference to the accompanying drawings wherein FIG. 1 is a diagrammatical sectional elevation of the apparatus laying detonating cord on snow covered ice;

Figure 1:
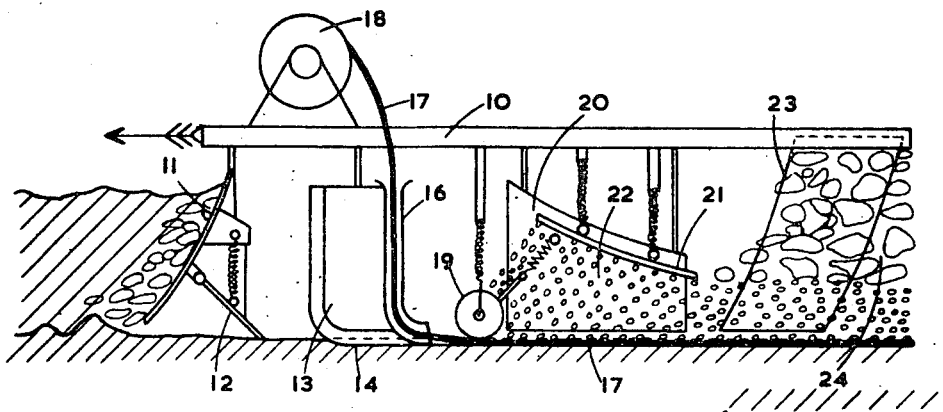
Figure 2:
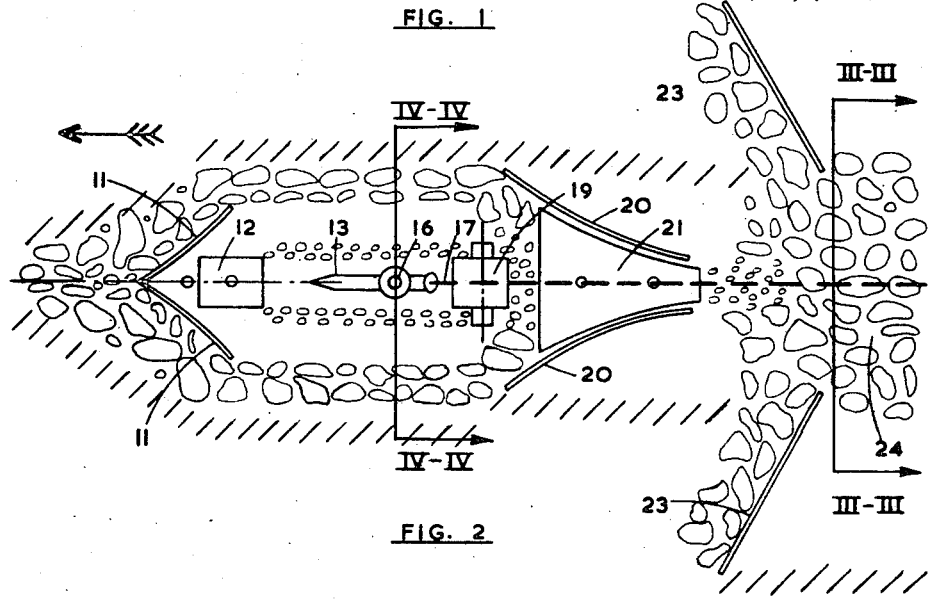
FIG. 2 is a plan of the apparatus as shown in FIG. 1.
Figure 3:
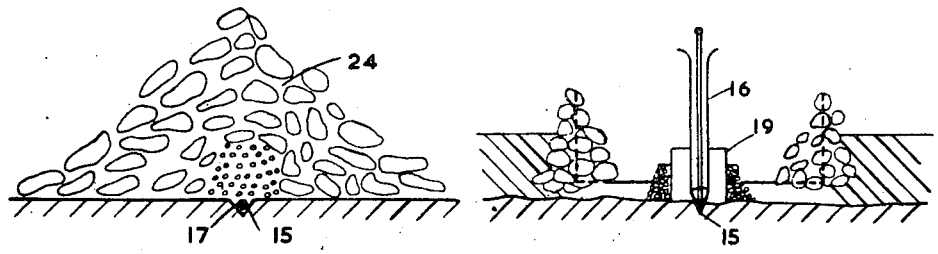
FIG. 3 is a section on the line III—III of FIG. 2.
Figure 4:
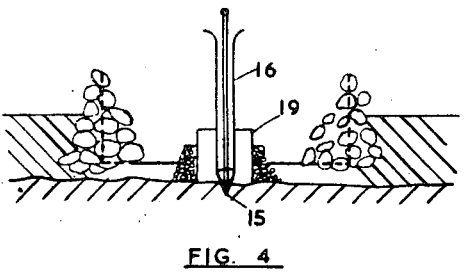
FIG. 4 is a section on the line IV—IV of FIG. 2.

The apparatus components are mounted on a frame 10 which is provided with skids (not shown) and, in operation is towed over the prospect area. A snow plough 11 is mounted at the front end of the frame 10 and adjusted so that its blades are about 2 inches above the hard surface in order to be clear of surface irregularities. A downwardly biassed blade 12 is hinged behind the plough 11 and adjusted to scrape the hard surface to remove the snow from a 3 inches wide area. A heavy rigid vertical plate 13, having a sharp bottom edge 14, is adjusted on the frame 10 to score a groove 15 in the cleared area of the surface as the apparatus is advanced. On the back edge of the plate 13 a tubular conduit 16 is attached so as to permit detonating cord 17 to be fed from a supply reel 18, also mounted on frame 10, into the groove 15. The conduit is a mild steel tube with an inner lining of polytetrafluoroethylene.

Immediately behind the conduit exit is a downwardly biassed roller 19 arranged to press on the emergent cord 17 and hold it in the groove 15 until it is covered with snow by a second snow plough 20. The plough 20 is arranged to move a portion of the snow, which has previously been broken and moved by plough 11, on top of the positioned detonating cord 17. Downwardly biassed plate 21 disposed between the blades of plough 20 is arranged so as to press downwardly on the snow layer 22 on top of the detonating cord 17 as the apparatus is advanced and thereby consolidate the snow immediately covering the cord 17. Behind the plough 20 a third plough with two large blades 23 is arranged to scoop snow from each side and to heap it as a deep loose layer 24 on top of the consolidated layer 22.

In using the apparatus for placing a detonating cord charge for seismic prospecting on snow covered ice, the apparatus is lowered on to the ice and moved forward to clear the snow from a small area of ice. A length of detonating cord 17 is led from the supply reel 18, through the conduit 16, under the roller 19 and tied to a spike driven into the ice. The apparatus is then moved forward on the ice, the plough 11 and blade 12 clears the snow from a narrow strip of ice, the edge 14 makes a groove in the cleared strip, detonating cord is laid into the groove and covered with finely broken snow by plough 20 which replaces on the cleared area the snow previously moved by plough 11. The fine snow covering is compressed by plate 21 and the compressed layer is then covered with a thick loose layer of snow by the plough blades 23. When the required length of detonating cord has been laid in position the cord is cut, an electric detonator is attached to the end of the laid cord length and the apparatus is further advanced to bring the detonator below the snow with parts of its electrical leading wires above the snow surface. The apparatus is then raised from the ice surface, the free ends of the detonator leading wires are drawn through the conduit 16 and the apparatus removed.

When the desired array of detonating cord lengths has been positioned as described, the detonator leading wires are connected to an electrical energy source and the array is detonated. The seismic waves are detected by appropriately placed geophones and recorded.

In putting the invention into practice for prospecting an area, having a surface of ice covered with a snow layer 12 to 24 inches thick, it was convenient to use lengths of 'Geoflex' (Registered Trade Mark) detonating cord having a core containing 200 grains of pentaerythritol tetranitrate per foot. The laid cord was covered by a loose layer of fine snow 15 to 24 inches thick which was tightly compressed to a layer 4 to 6 inches thick. The compressed snow was then covered to a depth of 3 to 4 feet with loose, roughly broken snow scooped from each side.

What we claim is:

1. A method of seismic prospecting comprising clearing snow from a strip of hard surface layer which is covered with snow so as to expose said hard layer, laying a line of explosive cord along and in contact with a longitudinal portion of the cleared hard surface, moving snow from along side the cleared strip and covering the line of explosive cord with a layer of said snow, compressing the said snow layer to form a stemming layer around the cord, detonating the explosive and recording the resulting seismic waves after reflection or refraction from subterranean rock layer interfaces.

2. A method as claimed in claim 1 wherein the line of explosive cord is laid by feeding it in continuous manner through an advancing conduit as the conduit is moved along the hard surface.

3. A method as claimed in claim 1 wherein the explosive cord is held in position on the hard surface until the covering of snow is applied.

4. A method as claimed in claim 3 wherein the explosive cord is biassed towards the surface until a covering of snow is applied.

5. A method as claimed in claim 1 wherein said longitudinal portion of said hard surface is defined by a shallow groove formed in said hard surface and the explosive cord is fed into the groove.

6. A method as claimed in claim 1 wherein further snow is heaped on top of the compressed snow layer to improve the stemming.

7. An apparatus for placing a line of explosive cord in position for use as a source of energy for the method of seismic prospecting of claim 1, the apparatus comprising in combination a first snow plough to clear snow from a surface strip as the apparatus is advanced, explosive feed means to feed a line of explosive cord in a continuous manner to lie on the surface of the cleared strip, a second snow plough to move snow, from a snow covered surface portion adjacent to the cleared strip, on top of the explosive cord and snow consolidating means to compress the snow on top of the explosive cord to provide stemming therefor.

8. An apparatus as claimed in claim 7 wherein the explosive feed means comprises a conduit terminating between the first and second snow ploughs through which conduit the explosive cord may be fed to the surface.

9. An apparatus as claimed in claim 8 wherein the conduit is attached to a rigid vertical plate positioned so that in use its bottom edge contacts the hard surface.

10. An apparatus as claimed in claim 9 wherein the plate is mounted so as to be free to move vertically to follow irregular surfaces.

11. An apparatus as claimed in claim 10 wherein the bottom edge of the plate is formed with a point or edge to score a groove in the hard surface into which groove the explosive cord may be fed.

12. An apparatus as claimed in claim 7 wherein the snow consolidating means comprises one or more downwardly biassed spring-loaded plates or rollers positioned behind the second snow plough to press down on the snow layer.

13. An apparatus as claimed in claim 7 comprising means to hold the explosive cord in its laid position until it is covered with snow by the second snow plough.

14. An apparatus as claimed in claim 13 wherein the cord holding means comprises a spring-loaded plate or roller.

15. An apparatus as claimed in claim 7 comprising a third snow plough positioned to heap snow on top of the compressed snow layer as the apparatus is advanced.

* * * * *